United States Patent [19]

Bozzuto

[11] 4,346,302
[45] Aug. 24, 1982

[54] OXYGEN BLOWN COAL GASIFIER SUPPLYING MHD-STEAM POWER PLANT

[75] Inventor: Carl R. Bozzuto, Enfield, Conn.

[73] Assignee: Combustion Engineering, Inc., Windsor, Conn.

[21] Appl. No.: 144,124

[22] Filed: Apr. 28, 1980

[51] Int. Cl.$^3$ .............................................. H02N 4/02
[52] U.S. Cl. ...................................... 290/1 R; 310/11
[58] Field of Search ....................... 290/1, 52; 310/11

[56] References Cited

U.S. PATENT DOCUMENTS

| | | | |
|---|---|---|---|
| 3,895,243 | 7/1975 | Amend et al. | 310/11 |
| 4,095,118 | 6/1978 | Rathbun | 290/1 |
| 4,107,557 | 8/1978 | Shepherd | 310/11 |
| 4,163,910 | 8/1979 | Matthews et al. | 310/11 |
| 4,200,815 | 4/1980 | Petrick et al. | 310/11 |
| 4,282,449 | 8/1981 | Bozzuto | 310/11 |

OTHER PUBLICATIONS

Hals et al., "Development and Design Characteristics of Auxiliary MHD Power Plant Components", 11/73, ASME, 73-WA/Ener 10.

*Primary Examiner*—Gene Z. Rubinson
*Assistant Examiner*—W. E. Duncanson, Jr.
*Attorney, Agent, or Firm*—William W. Habelt

[57] ABSTRACT

A magnetohydrodynamic generator (30) is fired with a clean, medium BTU combustible gas produced in an oxygen atmosphere. The combustible gas is generated in an oxygen blown coal gasifier (10) and cleaned of sulfur compounds, nitrogen compounds, and particulate matter before being delivered to the burner (32) of the MHD generator (30). An air separation plant (70) is provided to supply oxygen to both the MHD burner (32) and the coal gasifier (10). Nitrogen from the air separation plant (70) is preheated and utilized to dry the coal supplied to the gasifier (10). A vapor generator (40) is disposed downstream of the MHD generator (30) to receive and cool the hot gases exiting therefrom thereby generating steam.

12 Claims, 1 Drawing Figure

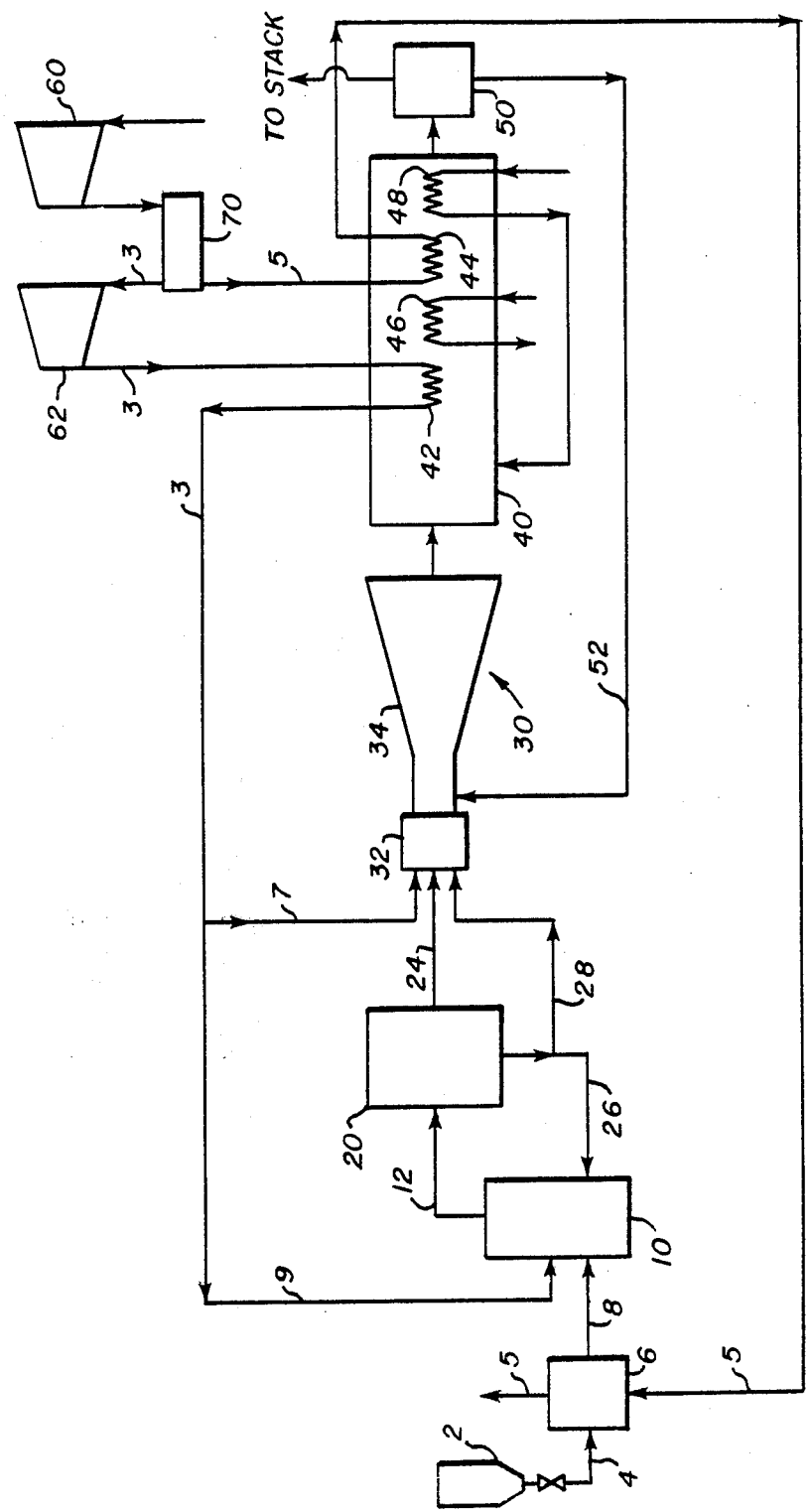

OXYGEN BLOWN COAL GASIFIER SUPPLYING MHD-STEAM POWER PLANT

BACKGROUND OF THE INVENTION

The present invention relates to a method and apparatus for combining a magnetohydrodynamic generator and vapor generator to utilize the product gas and the heat output of an oxygen blown coal gasifier to generate power. More specifically, the medium BTU product gas produced in an oxygen-block coal gasifier is used to fuel an MHD burner wherein the high temperature working fluid necessary to generate electricity via magnetohydrodynamics is produced.

In a magnetohydrodynamic (MHD) generator, fuel is combusted to form a high temperature working fluid. The working fluid must be formed at a sufficiently high temperature, preferably in the neighborhood of 2750 C., to promote ionization therein. The working fluid thus formed is passed through a static magnetic field at a high velocity thereby inducing direct current. Ergo, the MHD process provides for the direct conversion of energy into electricity without the need of a conventional turbine generator. When combined with a vapor generator disposed downstream of the MHD generator, wherein the waste heat contained in the gas products in the MHD burner is utilized to generate steam as an auxiliary source of power, overall efficiencies in the area of 50 percent can be obtained.

When integrating an MHD generator with a vapor generator, a number of problems have been encountered to which the present invention is addressed. First, if air is to be used as the oxidizer for the combustion of coal within the MHD burner, an independently-fired air heater must be provided to heat the combustion air supplied to the MHD burner to a high temperature, typically in the neighborhood of 1650 C. Significant technical problems have been encountered in designing high temperature air heaters which lead one to conclude that this equipment will be a high maintenance item and create significant operational problems.

Further, since the independently-fired air heater must utilize a clean fuel in order to prevent fouling and corrosion of heat transfer surface immersed therein, oil or gas must be used. Coal, because of its high ash content, cannot serve directly as a fuel for an independently-fired air heater. Because oil and gas are currently expensive and relatively scarce, this is an undesirable situation.

Second, when air is used as an oxidizer in an MHD burner, very high levels of oxides of nitrogen ($NO_x$) are formed in the MHD burner from the thermal fixation of nitrogen in the combustion air at the combustion temperatures in the neighborhood of 2750 C. Because the levels of $NO_x$ produced in the MHD burner would be far in excess of the levels permitted to be vented to the atmosphere under present emission regulations, provisions must be made for cleaning the exhaust gases from the MHD burner of $NO_x$ emissions before releasing the exhaust gases to the atmosphere.

The most common method proposed to date for cleaning the MHD exhaust gases of $NO_x$ is to provide a dwell chamber downstream of the MHD channel wherein the exhaust gases of the MHD burner would reside at a high temperature for a long enough time for the $NO_x$ therein to decompose back to molecular nitrogen and oxygen. In order to do this, a typical dwell chamber would be a fairly massive structure lined with refractory material to maintain the exhaust gas temperature above 1600 C. for a period of at least two seconds. To provide such a chamber requires considerable economic expense.

Additionally, economics require that the seed material introduced into the MHD burner to enhance the electrical conductivity of the working fluid discharged into the MHD channel must be reclaimed and recycled. Unfortunately, the high sulfur content of most coals proposed as fuel for the MHD burner results in sulfur contamination of the seed. Thus, expensive reprocessing of the reclaimed seed is required in order to remove the sulfur contamination.

SUMMARY OF THE INVENTION

An oxygen-blown coal gasifier is provided which produces a combustible medium BTU gas which is passed through a gas cleaner wherein gaseous sulfur compounds and particulate matter, including char, i.e., unburned carbon, and fly ash are removed thereby providing a clean combustible medium BTU gas. This clean combustible medium BTU gas is then fired in an oxygen atmosphere in the burner of an MHD generator to produce a high temperature working gas which when seeded with a readily ionizable material provides a high temperature plasma. This high temperature plasma is passed through the generation channel of the MHD generator to directly generate electricity.

Disposed downstream of the MHD generator is a vapor generator through which the seeded high temperature working gas or plasma exhausting from the MHD generation channel must pass. The vapor generator has various heat transfer surface whereby heat is transferred from the high temperature working gas to a liquid, such as water, to generate a vapor, such as steam, as the additional source of power.

To generate the oxygen to be used as the oxidizer for the coal gasifier and the MHD burner, compressed air is sent to an air separation plant. Oxygen from the air separation plant is compressed and preheated to a temperature of approximately 600 C. A portion of the oxygen is supplied to the MHD burner, and the remainder is supplied to the coal gasifier.

The nitrogen from the air separation plant is preheated and sent to the coal processor wherein coal is prepared for gasification in the coal gasifier. Here the coal is pulverized and dried by the heat contained in the nitrogen. The coal is then separated from the nitrogen and passed to the coal gasifier for gasification therein. The nitrogen is cleaned of particulate and then vented to the atmosphere.

The present invention provides an MHD generator which is inherently low in $NO_x$ emission production. Because the MHD burner is fueled with a gas which is relatively free of nitrogen and an oxidizer which is free of nitrogen, there will be little or no $NO_x$ formation via the high temperature thermal fixation of atmospheric nitrogen as in an air-blown MHD burner. Thus, it is expected that the $NO_x$ emissions from the power plant of the present invention would be extremely low—well within the present and projected future $NO_x$ emission limits.

Additionally, because oxygen is being used as the oxidizer, it is not necessary to preheat the oxidizer to the extremely high temperatures necessary when air is used as the oxidizer in the MHD burner. Thus, the necessity of an independently-fired air heater is eliminated. In the present invention, the oxygen can be preheated to a temperature of 600 C. simply by passing it in heat exchange relationship with the working gas as it passes through the vapor generator.

Finally, because sulfur is captured in the gasification process, no seed regeneration process is required to extract sulfur from the seed material.

BRIEF DESCRIPTION OF THE DRAWING

The FIGURE is a schematic flow diagram of the fluid flowing between and through the components of a power generating system as contemplated in the present invention.

DESCRIPTION OF THE PREFERRED EMBODIMENT

In the present invention, an oxygen-blown coal gasifier 10 is disposed in series with a gas cleaner 20, an MHD generator 30, and a vapor generator 40 to provide an entirely coal-fueled power plant with an overall conversion efficiency in the neighborhood of 50 percent. The coal gasifier 10 in combination with the gas cleaner 20 provides a supply of clean combustible medium BTU gas for the burner 32 of the MHD generator 30. In the burner 32, the clean combustible medium BTU gas produced in the coal gasifier 10 is combusted in an oxygen atmosphere to produce a high temperature working gas. Flue gas recirculation can be used to temper the working gas, if required, to a temperature of about 2750 C.

A seed material, which is readily ionizable, is introduced into the high temperature working gas discharging from the MHD burner 32 in order to provide a high temperature plasma. The high temperature plasma is passed through a static magnetic field established in the MHD generation channel 34, thereby directly producing electric power, and thence through a vapor generator 40 in heat exchange relationship therein with a liquid such as water so as to produce a vapor such as steam. The vapor produced in the vapor generator 40 is passed through a turbine, not shown, to produce additional electric power in the conventional manner.

In order to provide a supply of oxygen for both the coal gasifier 10 and the MHD generator 30, air is compressed in compressor 60 and sent to an air separation plant 70 wherein the air is separated into a first stream 3 consisting essentially of oxygen and a second stream 5 consisting essentially of nitrogen. The oxygen discharging from the air separation plant 70 is first compressed to a pressure in the range of 4 to 8 atmospheres and then preheated to a temperature in the neighborhood of 600 C., preferably by being passed in heat exchange relationship with the working gas passing through the vapor generator 40, although any preheating means would suffice. Having been preheated, the compressed oxygen stream 3 is divided into a first portion 7 which is directed to the burner 32 of the magnetohydrodynamic generator 30 and a second portion 9 which is directed to the coal gasifier 10.

Pulverized coal is fed to the coal processing means 6 from a coal storage silo 2 through line 4. Within the coal processing means 6, the raw coal is pulverized; and the pulverized coal is dried by mixing the pulverized coal with a heated gas to drive off any moisture contained in the coal. The dried pulverized coal is then separated from the drying gas and passed from the coal processing means 6 to the coal gasifier 10 under pressure through line 8. Although the drying medium may be preheated air or exhaust gas from the vapor generator 40, it is preferred to utilize the nitrogen from the air separation plant for this purpose.

In the preferred embodiment, the stream of nitrogen 5 leaving the air separation plant 70 is passed in heat exchange relationship with the working gas passing through the vapor generator 40 so as to preheat the nitrogen to a temperature suitable for drying the pulverized coal, typically a temperature in the range of 250 to 400 C. This preheated nitrogen is then mixed with the pulverized coal in the coal processing means 6 so as to dry the coal. The dried pulverized coal is then separated from the nitrogen, and the nitrogen is vented to the atmosphere. The coal processing means 6 would typically comprise a pulverizer wherein the raw coal is swept through the pulverizer and pulverized therein in a stream of preheated nitrogen and directed to a cyclone separator wherein the dried pulverized coal is removed from the nitrogen before the nitrogen is vented to the atmosphere.

In the gasifier 10, the dried pulverized coal entering through line 8 reacts with the preheated compressed oxygen stream 9 to form a combustible medium BTU gas. Since severe reducing conditions will exist within the gasifier, most of the sulfur and nitrogen within the coal will be converted to gaseous sulfur and nitrogen compounds such as hydrogen sulfide, carbonyl sulfide, ammonia, and some diatomic nitrogen. The raw gas containing these sulfur and nitrogen compounds along with carbon monoxide, carbon dioxide, water vapor, and particulate matter including char and fly ash, passes through gas pass 14 to a gas cleaner 20 wherein the gaseous sulfur compounds, ammonia, and particulate matter are removed by means of any one of several well-known processes. The typical gas cleaner would consist of a spray dryer, a cyclone, and a wet scrubber for particulate removal, a Stretford system for removing hydrogen sulfide, and any suitable scrubbing solution for removing ammonia, if required. In addition, carbon dioxide and water vapor can, if desired, be removed from the combustible medium BTU gas in the gas cleaner 20 with the carbon dioxide, a noncombustible gas, being recycled to the gasifier to react with coal to produce additional carbon monoxide, a combustible gas.

During the gasification process, the coal supplied to the gasifier 10 is devolatilized and partially combusted in an oxygen atmosphere somewhat deficient in the amount of oxygen required to completely combust the coal thereby forming a combustible medium BTU gas having a heating value in the range of 300 to 400 BTU's per standard cubic foot, a solid carbon residue of char and fly ash. As mentioned previously, most of the sulfur and nitrogen contained in the parent coal supplied to the gasifier is converted during the process to gaseous sulfur and nitrogen compounds which are subsequently removed from the medium BTU gas. Additionally, most of the moisture and hydrogen content of the parent coal is similarly driven out of the coal during the gasification process. Therefore, the resultant char is a low sulfur, low moisture, low nitrogen solid fuel.

The particulate matter removed from the combustible medium BTU gas produced in the gasifier 10 will contain a significant amount of this char as well as fly ash formed from the ash content of the parent coal. Most of the ash content of the parent coal will collect on the walls of the gasifier 10 and be removed therefrom as a molten slag rather than as fly ash in the medium BTU gas. In order to utilize the heating value remaining in the char removed from the medium BTU gas in the gas cleaner 20, most of the particulate matter removed in the gas cleaner 20 is recycled to the gasifier. In this manner, the char therein is given a second opportunity to react with the oxygen being fed to the gasifier to form carbon monoxide, a combustible gas. Additionally, the fly ash in the particulate matter recycled to the gasifier will become molten and collect on the walls of the gasifier and will be removed therefrom as slag.

In the preferred embodiment, a second portion of the particulate matter removed from the medium BTU gas in the gas cleaner 20 is conveyed to the burner 32 of the MHD generator 30 and fired therein. The char in the fly ash supplied to the MHD burner will, of course, combust with the oxygen provided therein to form carbon monoxide or carbon dioxide depending on the stoichiometry at which the MHD burner is operated. The fly ash in the particulate matter supplied to the MHD burner will collect on the walls of the MHD burner thereby providing protection for the walls of the MHD burner from the high temperature working gas being formed therein.

In accordance with the present invention, the clean combustible medium BTU gas passing from the gas cleaner 20 through gas pass 24 to the burner 32 of the magnetohydrodynamic generator 30 and the char contained in the particulate matter being supplied to the burner 32 from the gas cleaner 20 through duct 28 are combusted in the preheated oxygen to form a high temperature, i.e., approximately 2750 C., working gas. To enhance the conductivity of the working gas or plasma passing through the generation channel 34 of the MHD generator 30, seed material, i.e., material being readily ionized at a gas temperature approaching 2750 C. such as potassium carbonate, is injected into the high temperature working gas as it enters the generation channel 34.

The working gas cools as it passes through the MHD generation channel 34 and discharges to the vapor generator 40 at a temperature in the neighborhood of 2000 C. The vapor generator 40 provides heat transfer surface whereby heat is transferred from the working gas to a liquid such as water flowing through the heat transfer surface to generate a vapor such as steam as an additional source of power. The vapor generated in the vapor generator 40 is collected and passed through a conventional turbine cycle to produce additional electric power in a well-known manner. The working fluid then leaves vapor generator 40 and is vented to the atmosphere through a stack. In the preferred embodiment, the vapor generator 40 comprises a water-cooled boiler having a radiant chamber followed by a convection pass wherein various heat transfer surface, such as the oxygen preheater 42, the nitrogen preheater 44, and liquid or vapor heating surface 46 such as conventional economizers, superheaters, or reheaters, are disposed.

In a typical prior art MHD power plant, the radiant chamber of the vapor generator 40 would have to be lined with refractory material in order to hold the temperature of the working gas passing therethrough above a temperature of 1600 C. for at least 2 seconds in order to permit a portion of the $NO_x$ formed in the MHD burner to decompose to form diatomic nitrogen. However, since the fuels being burned in the MHD burner of the present invention are inherently low in nitrogen and since oxygen is being used as the oxidizer rather than air, the need of a refractory-lined radiant chamber wherein the working gas can dwell at a high temperature for a fairly long time is eliminated. Therefore, the refractory lining can be eliminated in the present invention and the vapor generator 40 made much smaller and, therefore, more economical.

It is within the contemplation of the present invention, and actually preferred, to operate the MHD burner 32 of the MHD generator 30 at a slightly substoichiometric oxidizer-to-fuel ratio, i.e., at an oxidizer-to-fuel ratio of 95 to 98 percent, in order to achieve a working gas temperature in the neighborhood of 2750 C. Thus, the clean combustible medium BTU gas from the gas cleaner 20, together with the char in that portion of the particulate matter fed to the MHD generator, are burned in the preheated oxygen fed to the MHD burner 32 to yield a working gas which will contain a moderate amount of carbon monoxide, which, of course, is combustible. In order to insure that this carbon monoxide is utilized for its heat production potential, additional oxidizer is injected into the radiant chamber of the vapor generator 40 to promote the burnout of the carbon monoxide and any other combustible matter present in the working gas discharging from the generation channel 34 of the MHD generator 30. The oxidizer injected into the vapor generator 40 may be either preheated oxygen from the air separation plant or simply preheated air.

Actually, it is preferred to use preheated air as the oxidizer for combustion within the vapor generator 40 because of the economical advantage of using air rather than oxygen and also because at the temperatures which will occur during the combustion of the unburned fuel in the vapor generator 40 very little $NO_x$ formation, via thermal fixation of the atmospheric nitrogen in the air, should occur. Thus, preheated air can be utilized without adversely affecting $NO_x$ emissions at this point in the MHD plant. It is expected that $NO_x$ emissions from the vapor generator 40 would be in the range of 20 to 50 PPM's, well within present and projected EPA emission limits. As shown in the FIGURE, it is contemplated that the air to be supplied to the vapor generator 40 would be preheated in a tubular heat exchanger 48 disposed within the convection pass of the vapor generator 40, so that the air will be passed in heat exchange with the working gas passing through the vapor generator 40. Alternatively, any other known air preheater, such as a Ljungstrom regenerative air heater, could be used to preheat the air being supplied to the vapor generator 40.

In order to reduce seed costs, it is preferred that a particulate collector 50 be disposed in the flue of the vapor generator 40 to recover the seed injected into the MHD generation channel 34 in order to increase the conductivity of the working gas. As the fuel fired in the MHD burner is essentially free of sulfur, seed reprocessing will not be required. That is, the seed recovered in the particulate collector 50 can be directly recycled through line 52 to the generation channel 34 of the MHD generator 30 without any processing.

I claim:

1. An apparatus for generating power from the combustion of coal comprising:
    a. an oxygen-blown magnetohydrodynamic generator having a burner for producing a high temperature working gas and a generation channel for directly generating electric power from the high temperature working gas, the generation channel connected to the burner so as to receive the high temperature working gas;

b. an oxygen-blown gasifier for producing a combustible medium BTU gas to be combusted in the burner of said magnetohydrodynamic generator;

c. means for supplying coal to said gasifier;

d. means for supplying preheated compressed oxygen to said gasifier and to the burner of said magnetohydrodynamic generator;

e. a gas cleaner disposed downstream with respect to gas flow of said coal gasifier for removing sulfur compounds, nitrogen compounds, and particulate matter including fly ash and unburned carbon from the combustible medium BTU gas produced in said gasifier;

f. a first gas pass connected between said coal gasifier and said gas cleaner thereby providing a gas path for conveying the combustible medium BTU gas from said gasifier to said gas cleaner;

g. a first transport means interconnected between said gas cleaner and said gasifier for conveying a portion of the particulate matter removed from the combustible medium BTU gas in said gas cleaner back to said gasifier for gasification of the unburned carbon contained therein;

h. a second gas pass connected between said gas cleaner and the burner of said magnetohydrodynamic generator for conveying the clean combustible medium BTU gas to the burner of said magnetohydrodynamic generator for combustion therein;

i. means operatively associated with said magnetohydrodynamic generator for injecting a seed material into the high temperature working gas produced in the burner of said magnetohydrodynamic generator as the high temperature working gas enters the generation channel of the magnetohydrodynamic generator, said seed material being readily ionized upon injection into the high temperature working gas so as to enhance the conductivity of the working gas passing through the generation channel of said magnetohydrodynamic generator;

j. a vapor generator connected to the generation channel of said magnetohydrodynamic generator so as to receive the seeded high temperature working gas passing out of the generation channel, said vapor generator having heat transfer surface whereby heat is transferred from the high temperature working gas to a liquid to generate a vapor as a source of power; and k. a flue connected to said vapor generator for venting the working gas passing through said vapor generator to the atmosphere.

2. An apparatus as recited in claim 1 further comprising second transport means interconnected between said gas cleaner and the burner of said magnetohydrodynamic generator for conveying a second portion of the particulate matter removed from the medium BTU gas in said gas cleaner to the burner of said magnetohydrodynamic generator for combustion of the unburned carbon contained therein and for providing a protective layer of molten ash on the inner walls of said burner.

3. An apparatus as recited in claims 1 or 2 further comprising means for supplying preheated combustion air to said vapor generator so as to burn out any combustible matter remaining in the working gas passing out of the generation channel of said magnetohydrodynamic generator.

4. A system as recited in claim 1 or 2 further comprising:

a. a particulate collector disposed in the flue of said vapor generator for removing the seed material entrained in the working gas passing therethrough; and b. means interconnected between said particulate collector and said generation channel for recycling the seed material removed from the working gas.

5. An apparatus as recited in claim 1 or 2 wherein said means for supplying preheated compressed oxygen to said gasifier and to the burner of said magnetohydrodynamic generator comprises:

a. means for separating air into a first and a second stream, the first stream consisting essentially of oxygen and the second stream consisting essentially of nitrogen;

b. means for compressing the oxygen stream discharging from said air separating means to a pessure in the range of 4 to 8 atmospheres;

c. means for heating the compressed oxygen stream to a temperature of approximately 600 C.;

d. means for conveying a first portion of the heated compressed oxygen stream from said oxygen heating means to said gasifier; and e. means for conveying a second portion of the heated compressed oxygen stream from said oxygen heating means to the burner of said magnetohydrodynamic generator.

6. An apparatus as recited in claim 5 wherein said means for heating the compressed oxygen stream comprises means for passing the compressed oxygen stream in heat exchange relationship with the working gas produced in said magnetohydrodynamic generator.

7. An apparatus as recited in claim 5 wherein said means for supplying coal to said gasifier comprises:

a. a pulverizer;

b. means for supplying coal to the pulverizer;

c. means for heating the nitrogen stream discharging from said air separating means to a temperature in the range of 250 to 400 C.;

d. means for passing the coal pulverized in said pulverizer in heat exchange relationship with the heated nitrogen stream whereby the pulverized coal is dried by evaporation of the moisture contained therein; and e. means for conveying the dried pulverized coal to said gasifier.

8. An apparatus as recited in claim 7 wherein said means for heating the nitrogen stream comprises means for passing the nitrogen stream discharging from said air separating means in heat exchange relationship with the working gas produced in said magnetohydrodynamic generator.

9. An apparatus as recited in claim 7 further comprising means for supplying preheated combustion air to said vapor generator so as to burn out any combustible matter remaining in the working gas passing out of the generation channel of said magnetohydrodynamic generator.

10. An apparatus as recited in claim 7 further comprising:

a. a particulate collector disposed downstream with respect to gas flow of said vapor generator for removing the seed material entrained in the working gas passing therethrough; and b. means interconnected between said particulate collector and said generation channel for recycling the seed material removed from the working gas.

11. A method of generating power from the combustion of coal comprising:
   a. gasifying coal in an oxygen atmosphere at a substoichiometric ratio of coal to oxygen to produce a combustible medium BTU gas;
   b. cleaning the combustible medium BTU gas to remove any sulfur compounds, nitrogen compounds, and particulate matter, including unburned carbon and fly ash, contained therein thereby producing a clean combustible medium BTU gas substantially free of sulfur compounds, nitrogen compounds, and particulate matter;
   c. burning the clean combustible medium BTU gas along with at least a portion of the particulate matter previously removed therefrom in an oxygen atmosphere to produce a high temperature working gas having a temperature of approximately 2750 C.;
   d. injecting a seed material into the high temperature working gas, said seed material being readily ionized upon injection into the high temperature working gas so as to enhance the conductivity of the working gas;
   e. passing the seeded high temperature working gas through a static magnetic field thereby directly generating power; and
   f. passing the working gas discharging from the static magnetic field in heat exchange relationship with a liquid so as to produce a vapor as a source for generating power.

12. A method as recited in claim 11 further comprising: reacting the remainder of the particulate matter removed from the medium BTU gas with oxygen to gasify any unburned carbon contained therein.

* * * * *